Patented May 9, 1933

1,907,822

UNITED STATES PATENT OFFICE

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA

METHOD OF IMPROVING SOLVENTS PREPARED FROM PARTIALLY OXIDIZED HYDROCARBONS

No Drawing. Application filed June 16, 1928. Serial No. 286,054.

In several copending applications I have described a vapor phase catalytic process for making intermediate partial oxidation products from petroleums or hydrocarbon mixtures from any source, such, for example, as shale oils or oils from the low temperature distillation of coal. Some of such pending applications are Serial No. 272,567, filed January 22, 1919 (now United States Patent No. 1,836,711, granted Dec. 15, 1931); Serial No. 281,124, filed March 7, 1919 (now United States Patent No. 1,697,653, granted January 1, 1929); Serial No. 335,939, filed November 5, 1919 (now United States Patent No. 1,759,620, granted May 20, 1930); Serial No. 435,355, filed January 6, 1921.

The oxidized bodies, such as alcohols, ethers, aldehydes, ketones and esters, serve as excellent solvents for gums, resins and nitrocellulose in the preparation of lacquers.

In my copending applications, Serial No 745,024, filed October 21, 1924 (now United States Patent No. 1,782,964, granted November 25, 1930), and Serial No. 747,106, filed October 31, 1924 (now United States Patent No. 1,894,097, granted January 10, 1933), I have described methods of extracting the more highly oxidized bodies from the condensed oxidation mixtures by the use of selective solvents, such as an alcohol-water mixture. Those methods are particularly effective for the extraction of oxidized bodies from mixtures boiling from 50° C. to 250° C., and also for the heavier fractions from some classes of oxidized oils.

Also, in an application filed on this day, Serial No. 286,055 (now United States Patent No. 1,835,600, granted December 8, 1931). I have described the use of isopropyl alcohol and water as an extracting medium, particularly for heavier fractions of the oxidation mixtures.

When these solvents are thus first extracted, they consist largely of aldehydes, ketones, ethers, esters and alcohols, with a small percentage of free organic acids. When treated with the calculated theoretical amount of alkali to remove the free acids, they are liable to have a yellowish color and a peculiar odor.

In continued study and experimenting with reference to improving the color, I have found that it is due to aldehydes, both of the saturated and unsaturated type, which are often present up to 30% of the solvent volume. In this experimenting I have discovered that I could cause a union of such aldehydes with some or all of the alcohols naturally present in the condensed oxidation product (these being of different molecular weights), and could also cause the union of the aldehydes with further alcohols added to the mixture. I found that in many cases the naturally occurring alcohols in the main oxidation product are insufficient to thus unite with the aldehydes, and in such cases have found that by adding more alcohol, even to a considerable excess, I can convert or condense the products into the acetal type.

In carrying out this conversion of the free aldehydes, to reduce or eliminate the odor, I found that treatment with dry calcium chloride or other suitable dehydrating agent, such as anhydrous sodium sulphate, either at ordinary room temperatures or at elevated temperatures, would cause the desired conversion by union of the aldehydes and alcohols.

I prefer to add more alcohol, preferably to an excess, to the oxidized oil fraction, before the calcium chloride treatment. The alcohol may be added to three or four times the amount necessary to react with all the free aldehydes present, the alcohol being preferably methyl, ethyl or isopropyl alcohol.

After adding this excess alcohol, the reaction mixture is preferably allowed to stand in contact with 5 to 10% of its weight of dry calcium chloride or other suitable dehydrating agent, for a period of five to ten days, preferably with occasional agitation. The reaction, consisting of the combination between the aldehydes and the alcohols, can be speeded up by heating the mixture to 85° to 90° C., although this tends to darken the color. This treatment with a dehydrating agent gives solvent stock from which solvents may be extracted under the extraction process above referred to, giving solvents which are satisfactory both as to color and odor. Carrying out the process at normal temperatures, gives better color.

As an example, 1000 cc of the condensed partial oxidized product, made by passing vaporized asphalt base naphtha mixed with air over a catalyst at a temperature below a red heat, was fractionally condensed or distilled. The resulting fraction, boiling from 100° to 190° C., was treated for ten days with 100 cc of anhydrous alcohol and 50 grams of dry fused calcium chloride. The mixture was shaken occasionally during this period, but no heat was applied. About 30% of the alcohol in the mixture remained as free alcohol in the product, the remaining alcohol being combined with the aldehydes and ketones or having reacted with the calcium chloride to form calcium chloride alcoholate.

From the solvent stock thus obtained, the solvent for cellulose products was extracted, preferably with 70% ethyl alcohol. Layers were formed, and when the alcohol layer was drawn off, it contained the desired extract bodies for solvent use. The solvent thus recovered was free from the odor of free aldehydes and was somewhat improved in color.

The advantages of my invention result from the improving of the extract solvents by conversion of the aldehydes and other bodies, such as ketones, into condensation products of the acetal type, thus improving the odor, and to some extent the color if carried out at proper temperatures. Where color is not material, the temperature may be raised and the reaction hastened.

Changes may be made in the process, the fractions used, whether previously cracked or not, etc., without departing from my invention, since I consider myself the first to convert the aldehydes and some other bodies present into products of the acetal type in such mixtures, thus improving their odor and in some cases their color.

I claim:

1. In the treatment of liquid partial oxidation products containing oxygen derivatives of different molecular weights in the range from alcohols through aldehydes, the steps consisting of condensing aldehydes of different molecular weights into products of the acetal type and then dissolving and separating portions thereof by a selective solvent other than water having a greater affinity for the more highly oxidized bodies than for less highly oxidized bodies.

2. In the treatment of liquid partial oxidation products containing oxygen derivatives of different molecular weights in the range from alcohols through aldehydes, the steps consisting of adding further alcohols to the mixture, condensing the said aldehydes of different molecular weights into products of the acetal type and then dissolving and separating portions thereof by an alcoholic solvent other than water having a greater affinity for the more highly oxidized bodies than for less highly oxidized bodies.

3. In the treatment of liquid partial oxidation products containing oxygen derivatives of different molecular weights in the range from alcohols through aldehydes, the steps consisting of adding further alcohol in excess of that necessary for reaction with the aldehydes present, condensing aldehydes of different molecular weights into products of the acetal type and then dissolving and separating portions thereof by a selective solvent other than water having a greater affinity for the more highly oxidized bodies than for less highly oxidized bodies.

4. In the treatment of liquid partial oxidation products containing different classes of oxygen derivatives, each of different molecular weights, in the range from alcohols through aldehydes, the steps consisting of applying an acetal-producing reagent thereto and converting the aldehydes into products of the acetal type and of different molecular weights, and separating the more highly oxidized bodies therefrom.

5. In the treatment of liquid partial oxidation products containing different classes of oxygen derivatives, each of different molecular weights, in the range from alcohols through aldehydes, the steps consisting of adding an alcohol to the mixture and adding a reagent to convert the aldehydes into products of the acetal type of different molecular weights, and separating the solvent type bodies therefrom.

6. In the treatment of liquid partial oxidation products containing oxygen derivatives of different molecular weights in the range from alcohols through aldehydes, the steps consisting of fractionating the same into fractions of different average molecular weights, each containing different classes of bodies, and adding to a fraction a reagent to convert the aldehydes into bodies of the acetal type of different molecular weights.

7. In the treatment of liquid partial oxidation products containing oxygen derivatives of different molecular weights in the range from alcohols through aldehydes, the steps consisting of fractionating the same into fractions of different average molecular weights, adding alcohols and a dehydrating agent to a fraction, and converting the aldehydes into products of the acetyl type of different molecular weights.

8. In the treatment of liquid partial oxidation products containing oxygen derivatives of different molecular weights in the range from alcohols through aldehydes and oxygenated organic acids, the steps consisting of adding a reagent to convert the aldehydes of different molecular weights into acetal type bodies of different molecular weights and removing the acids.

9. In the treatment of liquid partial oxidation products containing oxygen derivatives of different molecular weights in the range from alcohols through aldehydes, the steps consisting of fractionating the same, treating the fraction with a reagent to convert the aldehydes into acetal type bodies of different molecular weights and removing the acids.

10. In the treatment of liquid partial oxidation products containing different classes of oxygen derivatives, each of different molecular weights, in the range from alcohols through aldehydes, the steps consisting of applying an acetal-producing reagent thereto and converting the aldehydes into products of the acetal type and of different molecular weights, and then extracting therefrom the more highly oxidized bodies.

11. As a new composition of matter a liquid partial oxidation product containing oxygen derivatives of different molecular weights in the range from alcohols to oxygenated organic acids, said mixture containing a material proportion of aliphatic bodies of acetal type and of different molecular weights and being substantially free from free aldehydes.

12. As a new composition of matter, a fractionated portion of a liquid partial oxidation product containing oxygen derivatives of aliphatic hydrocarbons in the range from alcohols to oxygenated organic acids, said mixture containing bodies of acetal type and of different molecular weights and being substantially free from free aldehydes.

In testimony whereof I have hereunto set my hand.

JOSEPH HIDY JAMES.